United States Patent
Fox et al.

(10) Patent No.: US 10,777,195 B2
(45) Date of Patent: Sep. 15, 2020

(54) WAKE COMMAND NULLIFICATION FOR DIGITAL ASSISTANCE AND VOICE RECOGNITION TECHNOLOGIES

(71) Applicant: International Business Machines Corporation, Armonk, NY (US)

(72) Inventors: Jeremy R. Fox, Georgetown, TX (US); Andrew R. Jones, Round Rock, TX (US); Gregory J. Boss, Saginaw, MI (US); John E. Moore, Jr., Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 15/994,427

(22) Filed: May 31, 2018

(65) Prior Publication Data

US 2019/0371310 A1    Dec. 5, 2019

(51) Int. Cl.
*G10L 15/22* (2006.01)
*G10L 15/08* (2006.01)
*G10L 15/26* (2006.01)

(52) U.S. Cl.
CPC .............. *G10L 15/22* (2013.01); *G10L 15/08* (2013.01); *G10L 15/265* (2013.01); *G10L 2015/088* (2013.01); *G10L 2015/228* (2013.01)

(58) Field of Classification Search
CPC ............... G10L 15/22; G10L 2015/223; G10L 2015/088
See application file for complete search history.

(56) References Cited

U.S. PATENT DOCUMENTS

| | | | |
|---|---|---|---|
| 5,899,972 A | 5/1999 | Miyazawa | |
| 7,882,032 B1 | 2/2011 | Hoffman | |
| 9,245,527 B2 | 1/2016 | Lindahl | |
| 9,542,941 B1 | 1/2017 | Weksler et al. | |
| 9,812,126 B2 | 11/2017 | Khan et al. | |

(Continued)

OTHER PUBLICATIONS

Anonymous; Ubiquitous passive listening process and system based on user interactions; May 23, 2015; 4 pgs; IP.com.

(Continued)

*Primary Examiner* — Matthew H Baker
(74) *Attorney, Agent, or Firm* — Stephen R. Yoder

(57) ABSTRACT

A computing device includes a communication interface configured to interface and communicate with a communication system, an audio interface configured to interface and communicate with a user, a memory that stores operational instructions, and processing circuitry operably coupled to the communication interface, the audio interface, and to the memory that is configured to execute the operational instructions to perform various operations. The computing device monitors audio content, maintains a running buffer of most recent audio content, and detects a wake word command of the user. When detected, the computing device processes the most recent audio content including the wake word command of the user to determine validity/invalidity whether the wake word command of the user is invalid based on the most recent audio content. When invalid, the computing device rejects the wake word command of the user and continues to monitor the audio content and maintain the running buffer.

17 Claims, 8 Drawing Sheets

(56) References Cited

U.S. PATENT DOCUMENTS

| | | | |
|---|---|---|---|
| 10,152,966 B1* | 12/2018 | O'Malley | G10L 15/22 |
| 10,204,624 B1* | 2/2019 | Knudson | G10L 15/22 |
| 10,304,440 B1* | 5/2019 | Panchapagesan | G10L 15/08 |
| 10,453,460 B1* | 10/2019 | Wightman | G06F 16/316 |
| 2003/0216919 A1 | 11/2003 | Roushar | |
| 2008/0091426 A1 | 4/2008 | Rempel | |
| 2008/0301135 A1 | 12/2008 | Alves | |
| 2013/0144616 A1* | 6/2013 | Bangalore | G10L 15/197 |
| | | | 704/226 |
| 2014/0278435 A1 | 9/2014 | Ganong, III | |
| 2016/0035349 A1* | 2/2016 | Jung | G10L 15/063 |
| | | | 704/235 |
| 2019/0295540 A1* | 9/2019 | Grima | G10L 15/02 |

OTHER PUBLICATIONS

Human Factors (HF); User Interfaces; Generic Spoken Command Vocabulary for ICT Devices and Services; ETSI; Aug. 2009; 46 pgs; ETSI ES 202 076 v2.1.1.

Mohapatra; Voice controlling a device; Oct. 21, 2011; 3 pgs; IP.com.

* cited by examiner

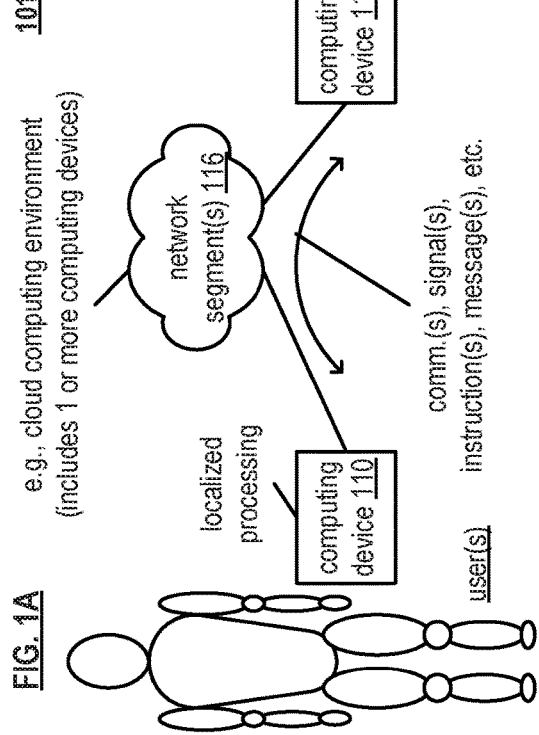
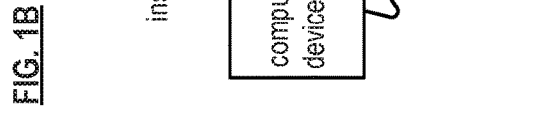
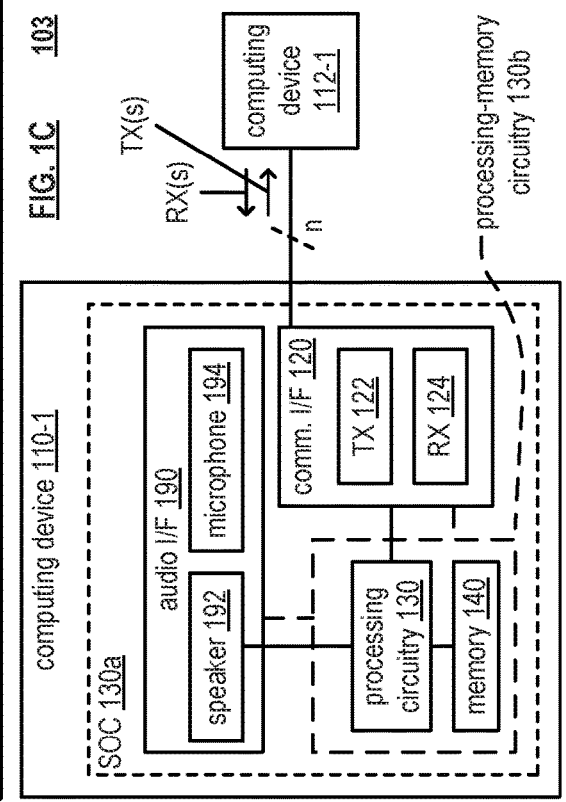
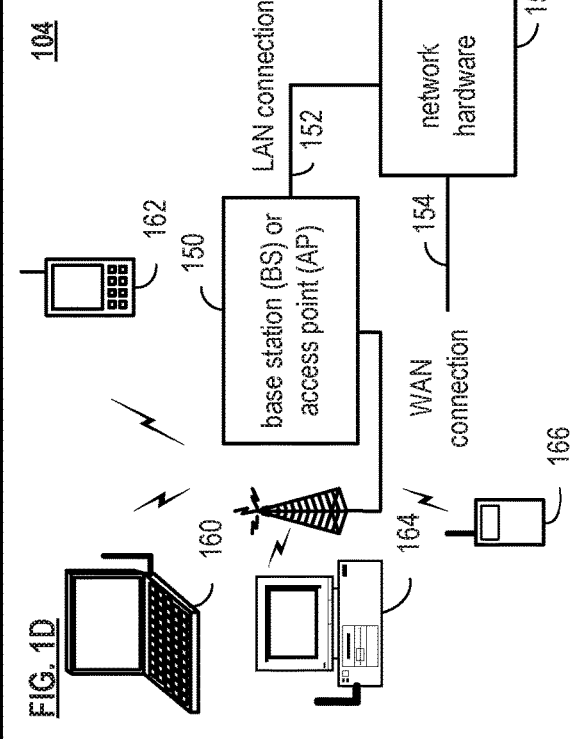

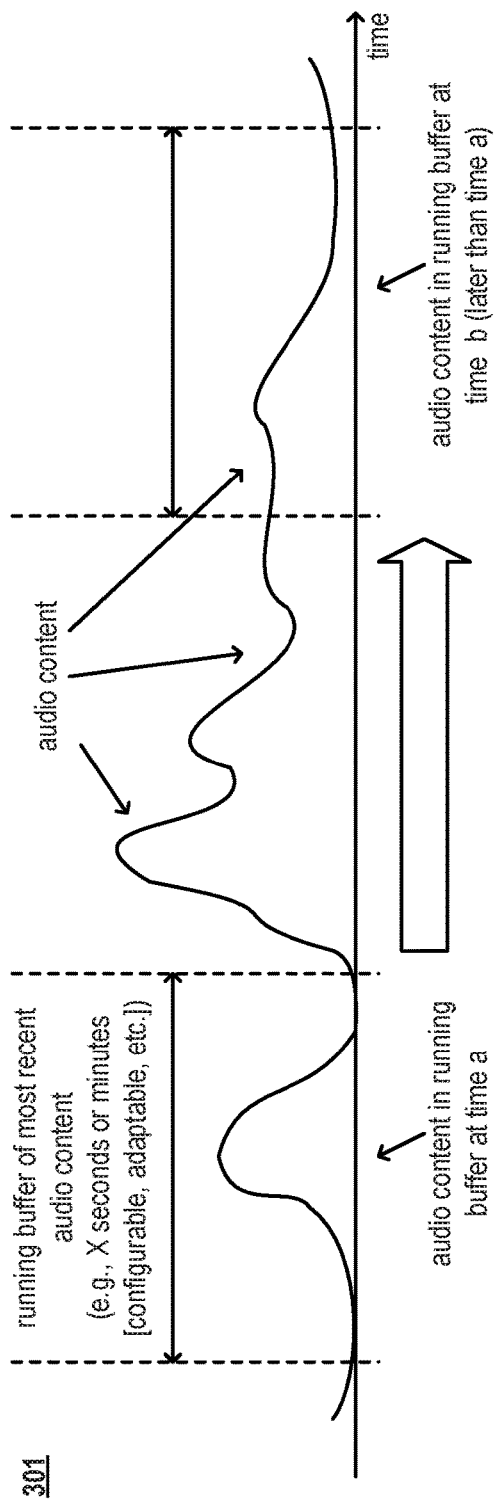
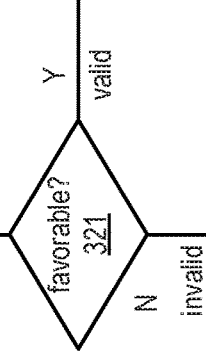
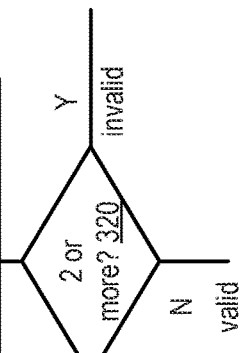
FIG. 3A
FIG. 3B
FIG. 3C

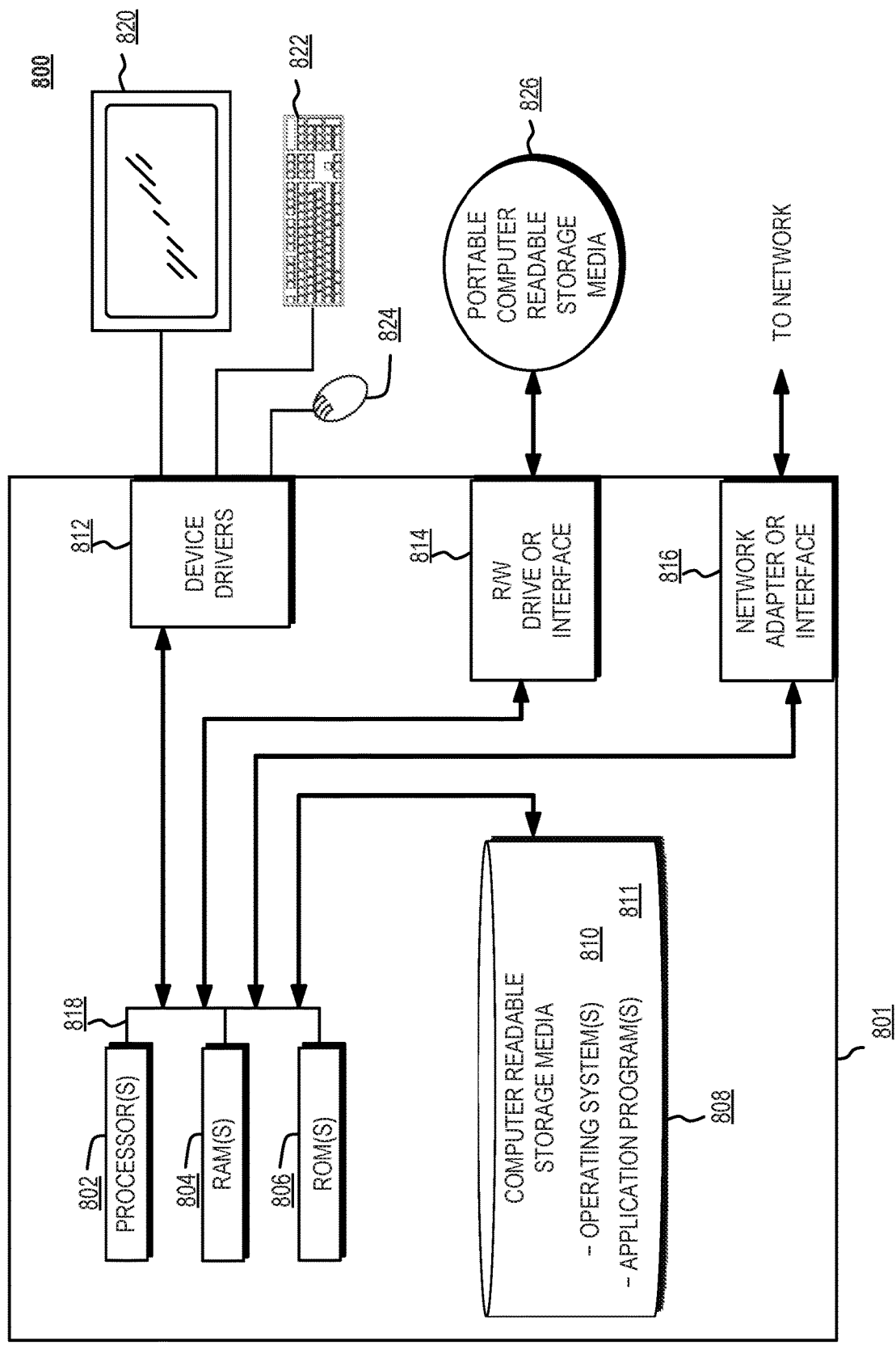

WAKE COMMAND NULLIFICATION FOR DIGITAL ASSISTANCE AND VOICE RECOGNITION TECHNOLOGIES

BACKGROUND

This invention relates to computing devices implemented to support digital assistance and voice recognition, and more specifically, to such computing devices implemented to perform wake command nullification based on invalidity of a wake command word.

In certain prior art computing devices implemented to support digital assistance and voice recognition, there can be instances where audio content is improperly determined to be a valid wake command word. When this occurs, the computing device can undesirably awaken when not specifically instructed to do so. This can be frustrating and bothersome for users of such computing devices, as they can be required to turn the computing device off after an unintended awakening.

Also, as additional computing devices that are implemented to support digital assistance and voice recognition are deployed in a vicinity (e.g., in a home, a room, a place of business, etc.), a wake command word intended for one computing device may unintentionally be received and processed by another computing device. This also can be frustrating and bothersome for users of such computing devices as unintended computing devices are awakening and commencing operations when they are not specifically instructed to do so. The prior art does not provide adequate solutions to address such problems and deficiencies of computing devices implemented to support digital assistance and voice recognition.

SUMMARY

Embodiments of the present invention disclose a computer-implemented method, a system, and a computer program product for supporting digital assistance and voice recognition including performing wake command nullification based on invalidity of a wake command word. In an example, a computing device implemented to support digital assistance and voice recognition includes a communication interface configured to interface and communicate with a communication system, an audio interface configured to interface and communicate with a user, memory that stores operational instructions, and processing circuitry operably coupled to the communication interface, the audio interface, and to the memory.

Audio content is monitored and a running buffer of most recent audio content that corresponds to a predetermined duration of time is maintained. Also, a wake word command of a user is detected within the running buffer of the most recent audio content. Based on detection of the wake word command of the user within the running buffer of the most recent audio content, the most recent audio content including the wake word command of the user to is processed to determine whether the wake word command of the user is invalid based on the most recent audio content.

Based on determination that the wake word command is invalid based on the most recent audio content, the wake word command of the user is rejected and the audio content continues to be monitored and the running buffer of the most recent audio content that corresponds to the predetermined duration of time is maintained.

Based on determination that the wake word command is valid based on the most recent audio content, one or more operations are performed that may include communication between the computing device and another computing device such as via a communication interface of the computing device and also via a communication system in which the computing device and the other computing device are included.

BRIEF DESCRIPTION OF THE DRAWINGS

FIG. 1A is a diagram illustrating an embodiment of one or more computing devices within one or more communication systems supporting audio and digital assistance related technology according to various embodiments of the present invention;

FIG. 1B is a diagram illustrating an embodiment of one or more computing devices within one or more communication systems according to various embodiments of the present invention;

FIG. 1C is a diagram illustrating an embodiment of a computing device configured to operate within one or more communication systems according to various embodiments of the present invention;

FIG. 1D is a diagram illustrating an embodiment of a wireless communication system according to various embodiments of the present invention;

FIG. 3A is a diagram illustrating an embodiment of audio content as a function of time and a running buffer of most recent audio content according to various embodiments of the present invention;

FIG. 3B is a diagram illustrating an embodiment of determining validity or invalidity of a wake word command according to various embodiments of the present invention;

FIG. 3C is a diagram illustrating another embodiment of determining validity or invalidity of a wake word command according to various embodiments of the present invention;

FIG. 8 depicts a block diagram of a computing device according to various embodiments of the present invention.

DETAILED DESCRIPTION

Figure 2:
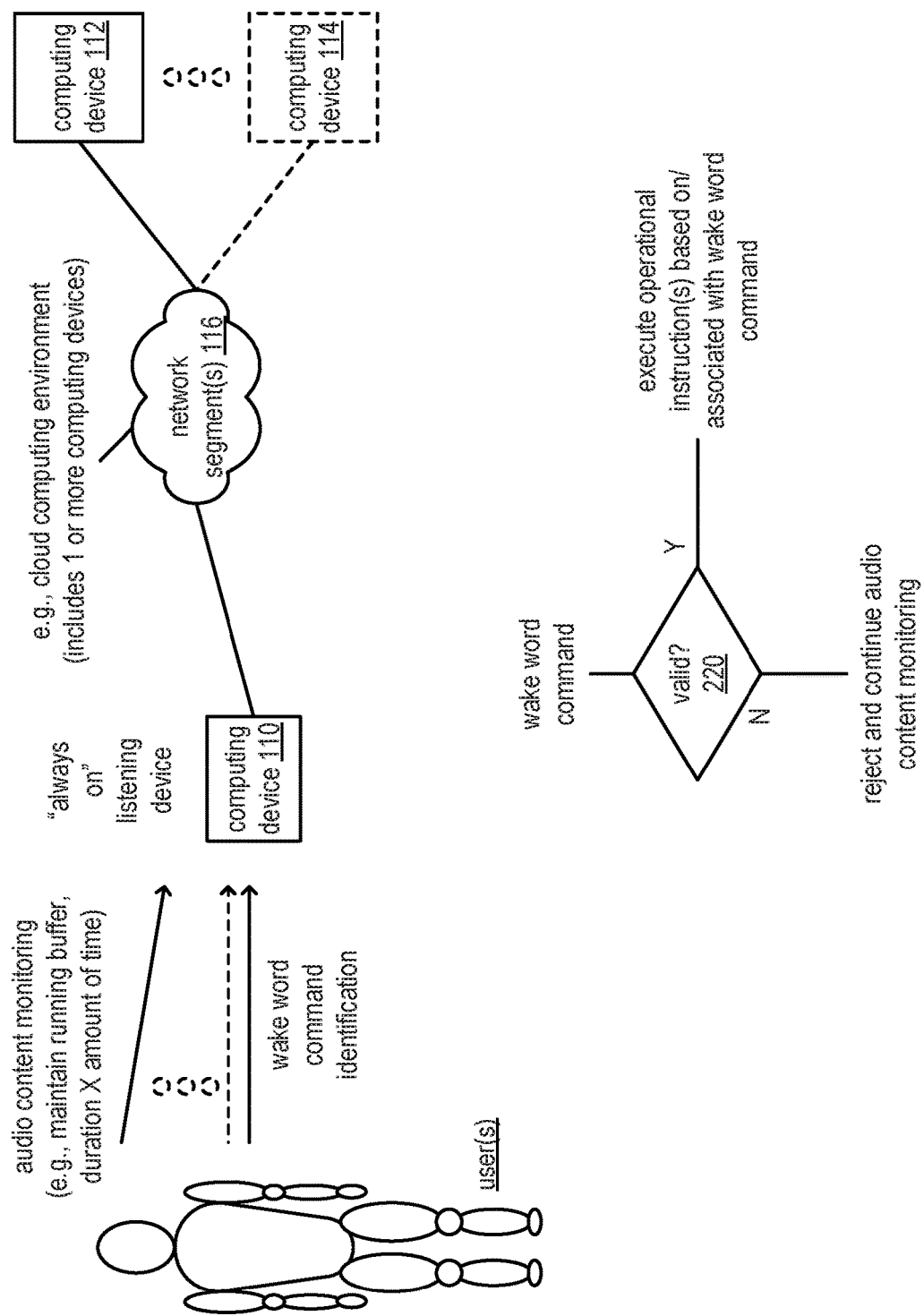
FIG. 2 is a diagram illustrating another embodiment of one or more computing devices within one or more communication systems supporting audio and digital assistance related technology according to various embodiments of the present invention.

According to an embodiment of the present invention, solutions are presented that eliminate the unnecessary "waking" of computing devices when not being requested. This disclosure presents solutions that allow for the processing of wake word commands that are detected by the computing device while ruling out those wake word commands that are determined to be invalid based on various considerations. For example, a wake word command is categorized as being invalid when failing to meet certain one or more criteria.

Note that a wake word command may include one or more words used to initiate user interaction with the computing device. For example, a user may say the word "computer" to in initiate user interaction with the computing device such that "computer" is the wake word command. Alternatively, a user may say the words "hey, honey, I'm home" to in initiate user interaction with the computing device such that the phrase "hey, honey, I'm home" is the wake word command. In general, any desired combination of one or more words, sounds, etc. may be used as a wake word command as configured by a user of the computing device (or as set via default by the computing device).

FIG. 1A is a diagram illustrating an embodiment 100 of one or more computing devices within one or more communication systems supporting audio and digital assistance related technology according to various embodiments of the present invention. One or more computing devices (e.g., computing device 110, computing device 112, etc.) is configured to support communications via one or more other computing devices and/or one or more network segments 116. In one example, the computing device 110 is in communication with a computing device 112 via the one or more network segments 116. For example, in some examples, the computing device 110 is associated with a first user, and the computing device 112 is associated with a second user. In other examples, the computing device 110 is associated with a user, and the computing device 112 is associated with a computing service such as may be associated with a digital assistance service. The one or more network segments 116 may be implemented in accordance with a cloud computing environment 50 such as described with reference to FIG. 6, and one or more network segments 116 may include one or more other computing devices therein (e.g., nodes, routers, gateways, servers, relays, transcoders, etc.) in some examples and/or embodiments.

Communications between the respective communication devices in this diagram and also in other embodiments, examples, diagrams, etc. herein may include any one or more of communications, signals, instructions, messages, and/or other types of communications.

In an example of operation and implementation, computing device 110 includes various components configured to perform various operations. Examples of such components include one or more of a communication interface configured to interface and communicate with a communication system, an audio interface configured to interface and communicate with a user, memory that stores operational instructions, and/or processing circuitry operably coupled to the communication interface, the audio interface, and to the memory. For example, the processing circuitry is configured to execute the operational instructions to perform various operations in cooperation and in conjunction with the other components.

In an example of operation and implementation, computing device 110 is configured to monitor audio content (e.g., via the audio interface) and maintain a running buffer of most recent audio content that corresponds to a predetermined duration of time in the memory. The computing device 110 is also configured to detect (e.g., via the audio interface) a wake word command of the user within the running buffer of the most recent audio content.

Based on detection of the wake word command of the user within the running buffer of the most recent audio content, the computing device 110 is configured to process the most recent audio content including the wake word command of the user to determine whether the wake word command of the user is invalid based on the most recent audio content.

Also, based on determination that the wake word command is invalid based on the most recent audio content, the computing device 110 is configured to reject the wake word command of the user and continue to monitor the audio content (e.g., via the audio interface) and maintain the running buffer of the most recent audio content that corresponds to the predetermined duration of time in the memory. Alternatively, based on determination that the wake word command is valid based on the most recent audio content, the computing device 110 is configured to execute one or more of the operational instructions associated with the wake word command. Examples of execution of such one or more of the operational instructions associated with the wake word command may include communicating with at least one other computing device 110 (e.g., computing device 112) via the communication interface and via the one or more network segments 116.

FIG. 1B is a diagram illustrating an embodiment 102 of one or more communication systems according to various embodiments of the present invention. One or more network segments 116 provide communication inter-connectivity for at least two computing devices 110 and 112 (e.g., such computing devices may be implemented and operative to support communications with other computing devices in certain examples, and such computing devices may alternatively be referred to as communication devices in such situations including both computing device and communication device functionality and capability). Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, satellite, microwave, and/or any combination thereof, etc. communication links. In general, the one or more network segments 116 may be implemented to support a wireless communication system, a wire lined communication system, a non-public intranet system, a public internet system, a local area network (LAN), a wireless local area network (WLAN), a wide area network (WAN), a satellite communication system, a fiber-optic communication system, and/or a mobile communication system. Also, in some instances, communication links of different types may cooperatively form a connection pathway between any two communication devices. Considering one possible example, a communication pathway between devices 110 and 112 may include some segments of wired communication links and other segments of optical communication links. Note also that the computing devices 110-114 may be of a variety of types of devices including stationary devices, mobile devices, portable devices, etc. and may support communications for any of a number of services or service flows including data, telephony, television, Internet, media, synchronization, etc.

In an example of operation and implementation, computing device 110 includes a communication interface to support communications with one or more of the other devices 112-114. In an example, the computing device 110 includes a communication interface configured to interface and communicate with a communication network (e.g., the one or more network segments 116), memory that stores operational instructions, and processing circuitry coupled to the communication interface and to the memory. The processing circuitry is configured to execute the operational instructions to perform various functions, operations, etc. Note that the communication supported by the computing device 110 may be bidirectional/to and from the one or more of the other computing devices 112-114 or unidirectional (or primarily unidirectional) from the one or more of the other computing devices 112-114.

In one example, computing device 110 includes a processing circuitry that generates, modulates, encodes, etc. and transmits signals via a communication interface of the computing device 110 and also receives and processes, demodulates, decodes, etc. other signals received via the communication interface of the computing device 110 (e.g., received from other computing devices such as computing device 112, computing device 114, etc.).

Note also that the communication interface 120 may include functionality to support receipt of user input and output of user output (e.g., via an audio interface, via a touchscreen, a keyboard, audio and/or video input/output ports, etc.) to facilitate interaction with one or more users of the computing device 110-1. Such functionality is implemented separately from the communication interface 120 in some examples and is integrated into the communication interface 120 in other examples.

In an example of operation, computing device 110 is configured to perform operations as described above with respect to FIG. 1A including with respect to audio content provided from one or more users and may also include communicating with multiple of the computing devices 112-114 within the one or more communication systems. In some examples, the computing device 110 is configured to request delivery of content (e.g., media, audio content such as music, news, etc.) from one or more of the computing devices 112-114 and to perform playback thereof for consumption by the one or more users. In other examples, the computing device 110 is configured to perform one or more financial transactions (e.g., ordering of one or more goods and/or services provided by one or more vendors) based on communications with the one or more of the computing devices 112-114.

FIG. 1C is a diagram illustrating an embodiment 103 of a computing device configured to operate within one or more communication systems according to various embodiments of the present invention. The computing device 110-1 includes a communication interface 120 and processing circuitry 130. The communication interface 120 includes functionality of a transmitter 122 and a receiver 124 to support communications with one or more other devices within a communication system. The computing device 110-1 may also include memory 140 to store information including one or more signals generated by the computing device 110-1 or such information received from other devices (e.g., computing device 112) via one or more communication channels. For example, memory 140 may also include and store various operational instructions for use by the processing circuitry 130 in regards to the processing of messages and/or other received signals and generation of other messages and/or other signals including those described herein (e.g., image and/or video signals). Memory 140 may also store information including one or more types of encoding, one or more types of symbol mapping, concatenation of various modulation coding schemes, etc. as may be generated by the computing device 110-1 or such information received from other devices via one or more communication channels. The communication interface 120 supports communications to and from one or more other devices (e.g., computing device 112-1 and/or other computing devices). Memory 140 may also store information including one or more types of video and/or image processing in accordance with the various aspects, embodiments, and/or examples, and their equivalents, described herein. In addition, the computing device 110-1 includes an audio interface 190 that includes functionality of a speaker 192 and a microphone 194 to support interface and communicate with one or more users (e.g., receive audio content via the microphone 194 and output other audio content via the speaker 192).

Operation of the communication interface 120 may be directed by the processing circuitry 130 such that processing circuitry 130 transmits and receives signals (TX(s) and RX(s)) via the communication interface 120. Generally speaking, computing device 110-1 is able to support communications with one or more other computing device within one or more communication systems including computing device 112-2.

A computing device 110-1 (e.g., which may be any one of computing devices 110, 112, or 114 as with reference to FIG. 1B) is in communication with another computing device 112-1 (and/or any number of other wireless computing devices) via a communication medium. The computing device 110-1 includes a communication interface 120 to perform transmitting and receiving of at least one signal, symbol, packet, and/or frame, etc. (e.g., using a transmitter 122 and a receiver 124) (note that general reference to packet or frame may be used interchangeably).

Generally speaking, the communication interface 120 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the computing device 110-1 operates), equalization, pre-equalization, metric generation, symbol mapping and/or de-mapping, automatic gain control (AGC) operations, and/or any other operations that may be performed by an AFE and/or PHY component within a computing device.

In some implementations, the computing device 110-1 also includes a processing circuitry 130, and an associated memory 140, to execute various operations including interpreting at least one signal, symbol, packet, and/or frame transmitted to computing device 112-1 and/or received from the computing device 112-1 and/or any other computing device. The computing devices 110-1 and 112-1 may be implemented using at least one integrated circuit in accordance with any desired configuration or combination of components, modules, etc. within at least one integrated circuit. Also, the computing devices 110 and/or 112 may each include one or more antennas for transmitting and/or receiving of at least one packet or frame wirelessly (e.g., computing device 110-1 may include m antennas, and computing device 112-1 may include n antennas, where m and n are positive integers).

Also, in some examples, note that one or more of the processing circuitry 130, the communication interface 120 (including the TX 122 and/or RX 124 thereof), and/or the memory 140 may be implemented in one or more "processing modules," "processing circuits," "processors," and/or "processing units" or their equivalents. Considering one example, a system-on-a-chip (SOC) 130a may be implemented to include the processing circuitry 130, the communication interface 120 (including the TX 122 and/or RX 124 thereof), and the memory 140 (e.g., SOC 130a being a multi-functional, multi-module integrated circuit that includes multiple components therein). Considering another example, processing-memory circuitry 130b may be implemented to include functionality similar to both the processing circuitry 130 and the memory 140 yet the communication interface 120 is a separate circuitry (e.g., processing-memory circuitry 130b is a single integrated circuit that performs functionality of a processing circuitry and a memory and is coupled to and also interacts with the communication interface 120).

Considering even another example, two or more processing circuitries may be implemented to include the processing circuitry 130, the communication interface 120 (including the TX 122 and/or RX 124 thereof), and the memory 140. In such examples, such a "processing circuitry," "processing circuitry," or "processing circuitries" (or "processor" or "processors") is/are configured to perform various operations, functions, communications, etc. as described herein. In general, the various elements, components, etc. shown within the computing device 110-1 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the computing device 110-1 includes both processing circuitry 130 and communication interface 120 configured to perform various operations. In other examples, the computing device 110-1 includes SOC 130a configured to perform various operations. In even other examples, the computing device 110-1 includes processing-memory circuitry 130b configured to perform various operations. Generally, such operations include generating, transmitting, etc. signals intended for one or more other computing device (e.g., computing device 112-1) and receiving, processing, etc. other signals received for one or more other devices (e.g., computing device 112-1).

In some examples, note that the communication interface 120, which is coupled to the processing circuitry 130, is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the computing device 110-1 may be communicated via any of these types of communication systems.

Note that computing device 110-1 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system, among other types of communication systems.

In an example of operation and implementation, a computing device includes a communication interface 120 configured to interface and communicate with a communication network, memory 140 that stores operational instructions, and processing circuitry 130 coupled to the communication interface and to the memory.

The processing circuitry 130 is configured to execute the operational instructions to perform various functions, operations, and processes (sometimes in cooperation with the communication interface 120 and/or the memory 140).

In an example, the processing circuitry 130 is configured to monitor audio content (e.g., via the audio interface 190) and maintain a running buffer of most recent audio content that corresponds to a predetermined duration of time in the memory. The processing circuitry 130 is also configured to detect (e.g., via the audio interface 190) a wake word command of the user within the running buffer of the most recent audio content.

Based on detection of the wake word command of the user within the running buffer of the most recent audio content, the processing circuitry 130 is configured to process the most recent audio content including the wake word command of the user to determine whether the wake word command of the user is invalid based on the most recent audio content. Also, based on determination that the wake word command is invalid based on the most recent audio content, the processing circuitry 130 is configured to reject the wake word command of the user and continue to monitor the audio content (e.g., via the audio interface 190) and maintain the running buffer of the most recent audio content that corresponds to the predetermined duration of time in the memory. Alternatively, based on determination that the wake word command is valid based on the most recent audio content, the processing circuitry 130 is configured to execute one or more of the operational instructions associated with the wake word command. Examples of execution of such one or more of the operational instructions associated with the wake word command may include communicating with at least one other processing circuitry 130 (e.g., computing device 112) via the communication interface and via the one or more network segments 116.

In some examples, based on determination that the wake word command is valid based on the most recent audio content, the computing device 110-1 is also configured to make the determination that the wake word command is invalid based on the most recent audio content including based on determining that the wake word command of the user is included in at least two separate sentences of the user. In even other examples, the computing device 110-1 is also configured to make the determination that the wake word command is invalid based on determining that the wake word command of the user comparing unfavorably with a wake word command context or being non-compliant with the wake word command context. For example, the wake word command of the user may be viewed as comparing unfavorably with the wake word command context when the wake word command of the user is not included in a conversational context that is associated with a wake word command. Also, the wake word command of the user may be viewed as being non-compliant with the wake word command context when the wake word command is used in a manner that is non-compliant with a context and manner in which a wake word command should be used.

In yet other examples, the computing device 110-1 is also configured to determine the wake word command context including to process a first portion of the most recent audio content preceding the wake word command of the user and/or a second portion of the most recent audio content following the wake word command of the user.

In even additional examples, the computing device 110-1 is also configured to make the determination that the wake word command is invalid based on a period of silence following the wake word command comparing unfavorably with a threshold period of time. In some examples, when the period of silence following the wake word command is longer than (or equal to) the threshold period of time, then the period of silence following the wake word command is deemed as comparing unfavorably with a threshold period of time.

Also, in some particular examples, the computing device 110-1 is also configured to identify the user based on the wake word command of the user, a first portion of the most recent audio content preceding the wake word command of the user, and/or a second portion of the most recent audio content following the wake word command of the use. Based on identity of the user, the computing device 110-1 is also configured to identify a threshold period of time that is associated with the user. The computing device 110-1 is also configured to make the determination that the wake word command is invalid based on a period of silence following the wake word command comparing unfavorably with the threshold period of time that is associated with the user. In some examples, when the period of silence following the wake word command is longer than (or equal to) the threshold period of time that is associated with the user, then the period of silence following the wake word command is deemed as comparing unfavorably with the threshold period of time that is associated with the user.

FIG. 1D is a diagram illustrating an embodiment 100 of a wireless communication system according to various embodiments of the present invention. The wireless communication system includes one or more base stations and/or access points 150, wireless communication devices 160-166 (e.g., wireless stations (STAs)), and a network hardware component 156. The wireless communication devices 160-166 may be laptop computers, or tablets, 160, personal digital assistants 162, personal computers 164 and/or cellular telephones 166 (and/or any other type of wireless communication device). Other examples of such wireless communication devices 160-166 could also or alternatively include other types of devices that include wireless communication capability (and/or other types of communication functionality such as wired communication functionality, satellite communication functionality, fiber-optic communication functionality, etc.). Examples of wireless communication devices may include a wireless smart phone, a cellular phone, a laptop, a personal digital assistant, a tablet, a personal computers (PC), a work station, and/or a video game device.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The one or more base stations (BSs) or access points (APs) 150 are operably coupled to the network hardware 156 via local area network connection 152. The network hardware 156, which may be a router, switch, bridge, modem, system controller, etc., provides a wide area network connection 154 for the communication system. Each of the one or more base stations or access points 150 has an associated antenna or antenna array to communicate with the wireless communication devices in its area. Typically, the wireless communication devices register with a particular base station or access point 150 to receive services from the communication system. For direct connections (i.e., point-to-point communications), wireless communication devices communicate directly via an allocated channel.

Any of the various wireless communication devices (WDEVs) 160-166 and one or more BSs or APs 150 may include a processing circuitry and/or a communication interface to support communications with any other of the wireless communication devices 160-166 and one or more BSs or APs 150. In an example of operation, a processing circuitry and/or a communication interface implemented within one of the devices (e.g., any one of the WDEVs 160-166 and one or more BSs or APs 150) is/are configured to process at least one signal received from and/or to generate at least one signal to be transmitted to another one of the devices (e.g., any other one of the one or more WDEVs 160-166 and one or more BSs or APs 150).

Note that general reference to a communication device, such as a wireless communication device (e.g., WDEVs) 160-166 and one or more BSs or APs 150 in FIG. 1D, or any other communication devices and/or wireless communication devices may alternatively be made generally herein using the term 'device' (e.g., "device" when referring to "wireless communication device" or "WDEV"). Generally, such general references or designations of devices may be used interchangeably.

The processing circuitry and/or the communication interface of any one of the various devices, WDEVs 160-166 and one or more BSs or APs 150, may be configured to support communications with any other of the various devices, WDEVs 160-166 and one or more BSs or APs 150. Such communications may be uni-directional or bi-directional between devices. Also, such communications may be uni-directional between devices at one time and bi-directional between those devices at another time.

In an example, a device (e.g., any one of the WDEVs 160-166 and one or more BSs or APs 150) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc.

and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 160-166 and one or more BSs or APs 150) includes a processing circuitry to support communications with one or more of the other wireless communication devices (e.g., any other of the WDEVs 160-166 and one or more BSs or APs 150). For example, such a processing circuitry is configured to perform both processing operations as well as communication interface related functionality. Such a processing circuitry may be implemented as a single integrated circuit, a system on a chip, etc.

In another example of implementation and operation, a wireless communication device (e.g., any one of the WDEVs 160-166 and one or more BSs or APs 150) includes a processing circuitry, a communication interface, and a memory configured to support communications with one or more of the other wireless communication devices (e.g., any other of the WDEVs 160-166 and one or more BSs or APs 150).

In an example of operation and implementation, WDEV 160 is configured to monitor audio content (e.g., via an audio interface of WDEV 160) and maintain a running buffer of most recent audio content that corresponds to a predetermined duration of time in the memory. The WDEV 160 is also configured to detect (e.g., via the audio interface) a wake word command of the user within the running buffer of the most recent audio content.

Based on detection of the wake word command of the user within the running buffer of the most recent audio content, the WDEV 160 is configured to process the most recent audio content including the wake word command of the user to determine whether the wake word command of the user is invalid based on the most recent audio content. Also, based on determination that the wake word command is invalid based on the most recent audio content, the WDEV 160 is configured to reject the wake word command of the user and continue to monitor the audio content (e.g., via the audio interface) and maintain the running buffer of the most recent audio content that corresponds to the predetermined duration of time in the memory. Alternatively, based on determination that the wake word command is valid based on the most recent audio content, the WDEV 160 is configured to execute one or more of the operational instructions associated with the wake word command. Examples of execution of such one or more of the operational instructions associated with the wake word command may include communicating with at least one other WDEV (e.g., WDEV 164 and/or some other computing device via the one or more BSs or APs 150 and/or via the network hardware 156).

FIG. 2 is a diagram illustrating another embodiment 200 of one or more computing devices within one or more communication systems supporting audio and digital assistance related technology according to various embodiments of the present invention. As digital assistance usage continues to grow with always on listening devices (e.g., Google Home, Amazon echo, Smart phones, etc.) throughout various locations including homes, businesses, institutes of higher learning, governmental offices, etc. many such locations now have devices that are close enough in proximity to hear commands that were "intended" for a different device or even a person perhaps. This disclosure provides solutions to enable a computing device implemented to support audio and digital assistance related technology to distinguish between listening devices via methods and processing logic relating to the wake command and validation thereof.

Such a computing device implemented to operate in accordance with various aspects, embodiments, and/or examples of the invention as described herein, and their equivalents, eliminate the unnecessary "waking" of such computing devices when not being requested. This is achieved by processing wake word command(s) (e.g., request(s)) that were detected (e.g., heard) but would rule out a wake command being used within a room such that a user was not desiring to wake the device.

This diagram shows certain elements that are also included within one or more other diagrams herein. In some examples, one or more users interact with computing device 110. The computing device 110 is associated with the one or more users, and the computing device 112 is associated with a computing service such as may be associated with a digital assistance service. The one or more network segments 116 may be implemented in accordance with a cloud computing environment 50 such as described with reference to FIG. 6.

This disclosure presents solutions for a system and method that are operable to perform identifying and distinguishing or "wake" word command(s) (e.g., as provided from the one or more users as requests) to computing devices implemented to support digital assistance and voice recognition. For example, the computing device 110 is configured to support digital assistance and voice recognition. In some examples, the computing device 110 is configured to operate based on an Internet of Things (JOT) "always on" listening device.

This disclosure provides for contextual background processing and analysis to the use of the wake word command through processing logic, so the wake word command does not take affect when being used in normal conversational language by the user (e.g., language that is not intended to initiate interaction with the computing device 110). When a wake word command is detected, but when the wake word command does not meet certain one or more criteria, then the wake word command event is nullified. For example, the computing device 110 is configured to detect a wake word command, and when the wake word command is being used or has been used improperly, the computing device 110 nullifies the event associated with the wake word command (e.g., does not execute any operational instructions associated with the wake word command, rejects the wake word command, and continues to monitor for audio content in accordance with an IOT "always on" listening device).

The computing device 110 is configured to capture audio content such as in accordance with TOT "always on" listening device operation. The computing device 110 is also configured to maintain a running buffer of a particular duration of time of that audio content that it is capturing (e.g., X amount of time, which may be 2 minutes, 3.5 minutes, etc. and/or any other desired period of time). Note also that a predetermined duration of time of the most recent audio content that is kept in memory may be configurable (e.g., set by a user), may be adaptive such as changed based on any desired consideration including operational history of the device, etc., or may be a fixed duration of time that remains constant.

For example, the computing device 110 is configured to perform audio content monitoring and perform wake work command identification. In an example, the computing device 110 is configured to detect a wake word command in accordance with performing audio content monitoring. When the wake word command is determined to be valid (e.g., via step 220), the computing device 110 is configured to execute one or more of the operational instructions associated with the wake word command. Examples of such one or more of the operational instructions associated with the wake word command may include communicating with at least one other computing device (e.g., computing device 112, and/or computing device 114) via a communication interface of the computing device 110 and via the one or more network segments 116. Alternatively, when the wake word command is determined to be invalid (e.g., via step 220), the computing device 110 is configured to reject the wake word command of the user and continue to perform audio content monitoring and maintaining the running buffer of the most recent audio content that corresponds to the predetermined duration of time in the memory.

In an example, the computing device 110 is configured to monitor audio content and maintain a running buffer of most recent audio content. This running buffer of most recent audio content corresponds to a predetermined duration of time in the memory, which may be fixed, programmable, configurable, or adaptable based on various one or more considerations. When performing the audio content monitoring, the computing device 110 is configured to detect a wake word command of the user within the running buffer of the most recent audio content.

Then, based on detection of the wake word command of the user within the running buffer of the most recent audio content, the computing device 110 is configured to process the most recent audio content including the wake word command of the user to determine whether the wake word command of the user is invalid based on the most recent audio content.

Based on determination that the wake word command is invalid based on the most recent audio content, the computing device 110 is configured to reject the wake word command of the user and continue to monitor the audio content and maintain the running buffer of the most recent audio content that corresponds to the predetermined duration of time in the memory.

Alternatively, based on determination that the wake word command is valid based on the most recent audio content, the computing device 110 is configured to execute one or more of the operational instructions associated with the wake word command. Examples of such one or more of the operational instructions associated with the wake word command may include communicating with at least one other computing device such as computing device 112.

FIG. 3A is a diagram illustrating an embodiment 301 of audio content as a function of time and a running buffer of most recent audio content according to various embodiments of the present invention. This diagram shows the audio content signal as a function of time as a computing device is configured to monitor audio content and maintain a running buffer of most recent audio content. The predetermined duration of time of the most recent audio content that is stored in the memory of computing device. In some examples, the computing device continues to capture more audio content and deletes the oldest audio content to make room for new audio content while maintaining the running buffer of most recent audio content (e.g., delete the oldest 5 seconds of audio content as 5 new seconds of audio content are captured). In some examples, the computing device offloads and stores the oldest audio content (e.g., locally, in a remote storage device, etc.) for other uses such as offline processing. As can be seen as a function of time, at different times, there will be different audio content in the running buffer. Looking at the left hand side (LHS) of the diagram, at time a, there is first audio content in the running buffer. Looking at the right hand side (RHS) of the diagram, at time b (that is later than time a along the time axis), there is second audio content in the running buffer that is different than the first audio content. In some examples, when a computing device is configured to detect a wake word command, the computing device is configured to process one or more portions of the audio content within the running buffer (e.g., before the detection of the wake word command, after the detection of the wake word command, or before and after the detection of the wake word command).

Some of the following diagrams show different respective means by which a wake word command may be determined to be valid or invalid. Each of these various means may be used separately or in cooperation with one another by a computing device that is configured to perform processing of a wake word command to determine whether it is valid or not and should be acted upon or not.

FIG. 3B is a diagram illustrating an embodiment 302 of determining validity or invalidity of a wake word command according to various embodiments of the present invention. In this diagram, a computing device is configured to perform audio content monitoring and perform wake work command identification and configured to determine whether the wake word command is valid to not. In this example, the computing device is configured to process the wake work command and one or more portions of the audio content within the running buffer to determine a number of separate sentences in which the wake word command is include (step 310). When the wake word command is determined to be included in 2 or more sentences (e.g., via step 320), the computing device is configured make a determination that the wake word command is invalid. Alternatively, when the wake word command is determined to be included in fewer than 2 or more sentences, such as only 1 sentence (e.g., via step 320), the computing device is configured make a determination that the wake word command is valid. In general, the computing device is configured to analyze if a wake word command was part of two different sentences.

In an example of operation and implementation, the computing device is configured to use a previous X number of minutes of audio recording to deduce the language patterns and usage of one or more users of the computing device (e.g., where X minutes is any desired number of minutes, and is 2 minutes in a specific example). In some examples, the computing device operates by using the Watson Alchemy Language for advanced Natural Language Processing (NLP) such as described at the following Internet web address:

https://www.ibm.com/watson/developercloud/alchemy-language.html

In an example, the computing device is configured to perform audio content monitoring and detect "Hey John, I'm leaving work at 3:00 p.m. today is that ok, hey? Google told me this morning there will be a thunderstorm at rush hour today."

In this example, the computing device is configured to differentiate the difference between "hey & Google" being in different sentences. Through differentiating, the computing device is configured clearly to understand that Google is not being given a command, but is instead being referenced indirectly. In such a case, the computing device is configured to make a determination that the wake word command is invalid.

Also, in some examples, based on determination that the wake word command is valid based on the most recent audio content, the computing device is configured to make the determination that the wake word command is invalid based on the most recent audio content including based on determining that the wake word command of the user is included in at least two separate sentences of the user.

FIG. 3C is a diagram illustrating another embodiment 303 of determining validity or invalidity of a wake word command according to various embodiments of the present invention. In this diagram, a computing device is configured to perform audio content monitoring and perform wake work command identification and configured to determine whether the wake word command is valid to not. In this example, the computing device is configured to process the wake work command and wake word command context.

For example, the computing device is configured to perform comparing of the wake work command to wake word command context (and/or wake word command compliance) (e.g., in step 311). When the wake word command is determined to compare favorably with wake word command context (and/or wake word command compliance) (e.g., via step 320), the computing device is configured make a determination that the wake word command is valid. Alternatively, when the wake word command is determined to compare unfavorably with wake word command context (and/or wake word command compliance) (e.g., via step 320), the computing device is configured make a determination that the wake word command is invalid. In general, the computing device is configured to analyze if a wake word command was part of two different sentences.

For example, a computing device is configured to make the determination that the wake word command is invalid based on determining that the wake word command of the user comparing unfavorably with a wake word command context or being non-compliant with the wake word command context. For example, the wake word command of the user may be viewed as comparing unfavorably with the wake word command context when the wake word command of the user is not included in a conversational context that is associated with a wake word command. Also, the wake word command of the user may be viewed as being non-compliant with the wake word command context when the wake word command is used in a manner that is non-compliant with a context and manner in which a wake word command should be used.

The computing device is configured to analyze the previous few minutes of conversation (e.g., using Watson Alchemy) and compare and contrast it to the current wake word command for context.

In an example of operation and implementation, the computing device is configured to perform active listening such as an IOT always on listening device. The computing device is always listening and regularly running an X minute buffer (e.g., the last X minutes of audio is held in memory, where X is 2 minutes in a specific example). The computing device is configured to acquire the reference and words being used regarding the wake command.

Based on a wake work command being detected, it is analyzed for proper wake word command usage. For example, the computing device is configured to determine whether the wake word command was being referenced as a command or merely included in passing context.

If the wake word command is detected as a proper wake word command versus just passing context, the event trigger step that starts the computing device is initiated.

Figure 4B:
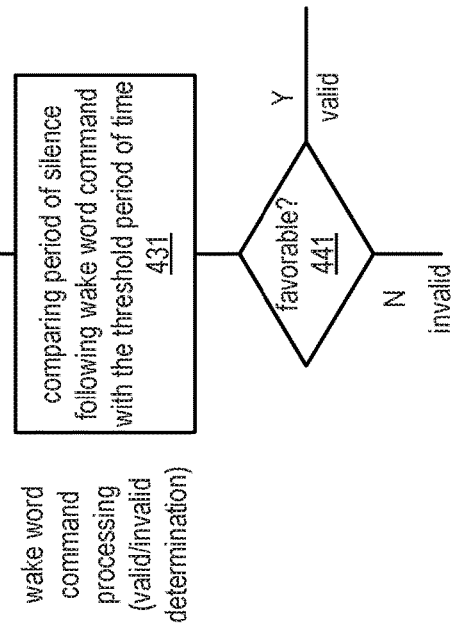
FIG. 4B is a diagram illustrating another embodiment of determining validity or invalidity of a wake word command according to various embodiments of the present invention.
Figure 4A:
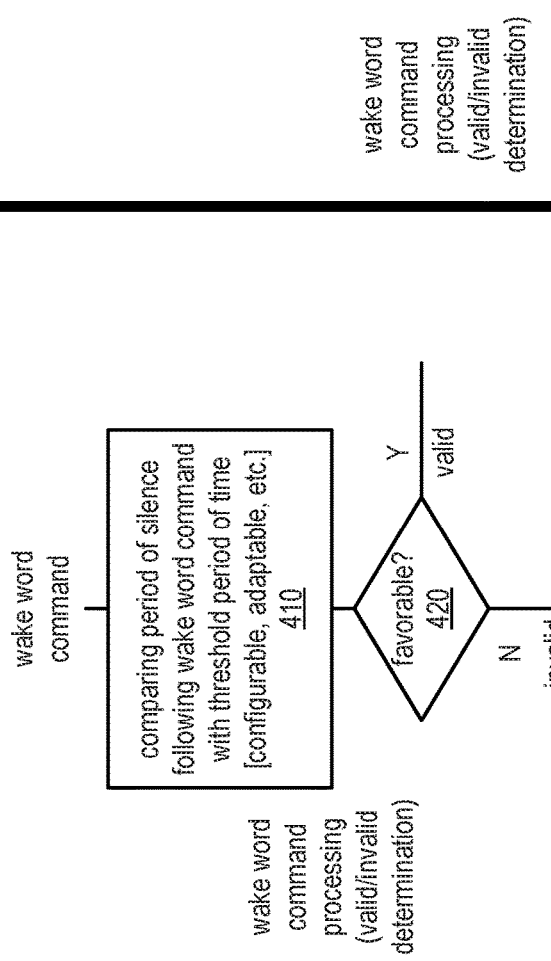
FIG. 4A is a diagram illustrating another embodiment of determining validity or invalidity of a wake word command according to various embodiments of the present invention.

FIG. 4A is a diagram illustrating another embodiment 401 of determining validity or invalidity of a wake word command according to various embodiments of the present invention. In this diagram, a computing device is configured to perform audio content monitoring and perform wake work command identification and configured to determine whether the wake word command is valid to not. In this example, the computing device is configured to process the wake work command and a period of silence following it.

For example, the computing device is configured to perform comparing of a period of silence following the wake work command with a threshold period of time (which may be configurable, adaptable, fixed, etc.) (e.g., in step 420). When the period of silence following the wake work command is determined to compare favorably with threshold period of time (e.g., via step 420), the computing device is configured make a determination that the wake word command is valid. Alternatively, the period of silence following the wake work command is determined to compare unfavorably with threshold period of time (e.g., via step 420), the computing device is configured make a determination that the wake word command is invalid.

In an example of operation and implementation, the computing device is configured to make the determination that the wake word command is invalid based on a period of silence following the wake word command comparing unfavorably with a threshold period of time. In some examples, when the period of silence following the wake word command is longer than (or equal to) the threshold period of time, then the period of silence following the wake word command is deemed as comparing unfavorably with a threshold period of time.

In an example of operation and implementation, the computing device is configured to analyze a wake word command and determine its validity by determining the length of silence following the command. For example, if there is a pause after a wake word command that is of some unacceptable length, then the wake word command is rejected or ignored.

For example, consider the computing device detects audio content including, "Hey Google . . . (long pause of 12 seconds), Perhaps we should go to a Movie tonight Greg."

Based on this example, and considering an example of the threshold period of time being less than 12 seconds (e.g., 2 seconds), the computing device is configured to disregard an analysis of the wake word command and usage of the wake word command and/or word or phrase following the wake word command if a long pause is encountered after the wake word (e.g., exceeding the threshold period of time).

FIG. 4B is a diagram illustrating another embodiment 402 of determining validity or invalidity of a wake word command according to various embodiments of the present invention. In this diagram, the computing device is configured to identify the user based on the wake word command of the user, a first portion of the most recent audio content preceding the wake word command of the user, and/or a second portion of the most recent audio content following the wake word command of the use (e.g., step 411). Based on identity of the user, the computing device is also configured to identify a threshold period of time that is associated with the user (e.g., step 421). The computing device is also configured perform comparing of the silence following the wake word command with the threshold period of time that is associated with the user (e.g., step 431).

The computing device is also configured to make the determination that the wake word command is invalid based on a period of silence following the wake word command comparing unfavorably with the threshold period of time that is associated with the user (e.g., via step 441). In some examples, when the period of silence following the wake word command is longer than (or equal to) the threshold period of time that is associated with the user, then the period of silence following the wake word command is deemed as comparing unfavorably with the threshold period of time that is associated with the user.

The computing device is also configured to make the determination that the wake word command is valid based on a period of silence following the wake word command comparing favorably with the threshold period of time that is associated with the user (e.g., via step 441). In some examples, when the period of silence following the wake word command is less than the threshold period of time that is associated with the user, then the period of silence following the wake word command is deemed as comparing favorably with the threshold period of time that is associated with the user.

In another example of operation and implementation, the computing device is configured to analyze post wake phrase conversation with pre-wake phrase conversation to determine contextual flow. In an example of operation and implementation, the computing device is configured to use a previous X number of minutes of audio recording to deduce the language patterns and usage of one or more users of the computing device (e.g., where X minutes is any desired number of minutes, and is 2 minutes in a specific example). In some examples, the computing device operates by using the Watson Alchemy Language for advanced Natural Language Processing (NLP) such as described at the following Internet web address:

https://www.ibm.com/watson/developercloud/alchemy-language.html

The computing device is configured to catalog some or all prior pre-wake word command usage for both positive and negative events pertaining to the wake word command(s) yielding contextual flow.

In one example, the audio content includes: "Alexa please do the dishes" and Alexa the digital assistant says "I'm sorry, I can't help with that" would be considered a negative event.

In another example, the audio content includes: "Alexa please do the dishes" and Alexa the daughter says "Ok Dad" would be considered a positive event.

The computing device is configured to review any related Natural Language Processing (NLP) pattern recognition findings to help discover any previous references from the one or more users. The computing device is configured to compare past uses of the wake word command to the data stored for the last X minutes in the running buffer.

If past precedence or usage does exist, the computing device is configured to follow past processing flow. Alternatively, if no precedence or past usage exists within the last X minutes in the running buffer, the computing device is configured to process the command normally.

Based on the Natural Language Processing (NLP) steps performed by the computing device, the computing device is configured to determine what the wake word command context is and how to use that to validate or accept the wake word command. In some examples, the computing device is configured to utilize the Watson Services and Natural Language Processing (NLP) to help detect key identifiers regarding usage. In other examples, the computing device is configured to call the Watson Application Program Interface (API) (e.g., via a communication interface of the computing device and via one or more network segments coupling to the Watson API) to access Natural Language Processing (NLP) and produce both positive and negative results.

As such, the computing device is configured to complete the analysis of the usage of the wake word. When the computing device confirms a positive wake word command detection, then the computing device is configured to accept the wake word command and take appropriate action based on the wake word command usage and context. Alternatively, when the computing device confirms a negative wake word command detection, the computing device is configured to ignore the wake word and not take any action based on context.

Figure 5:
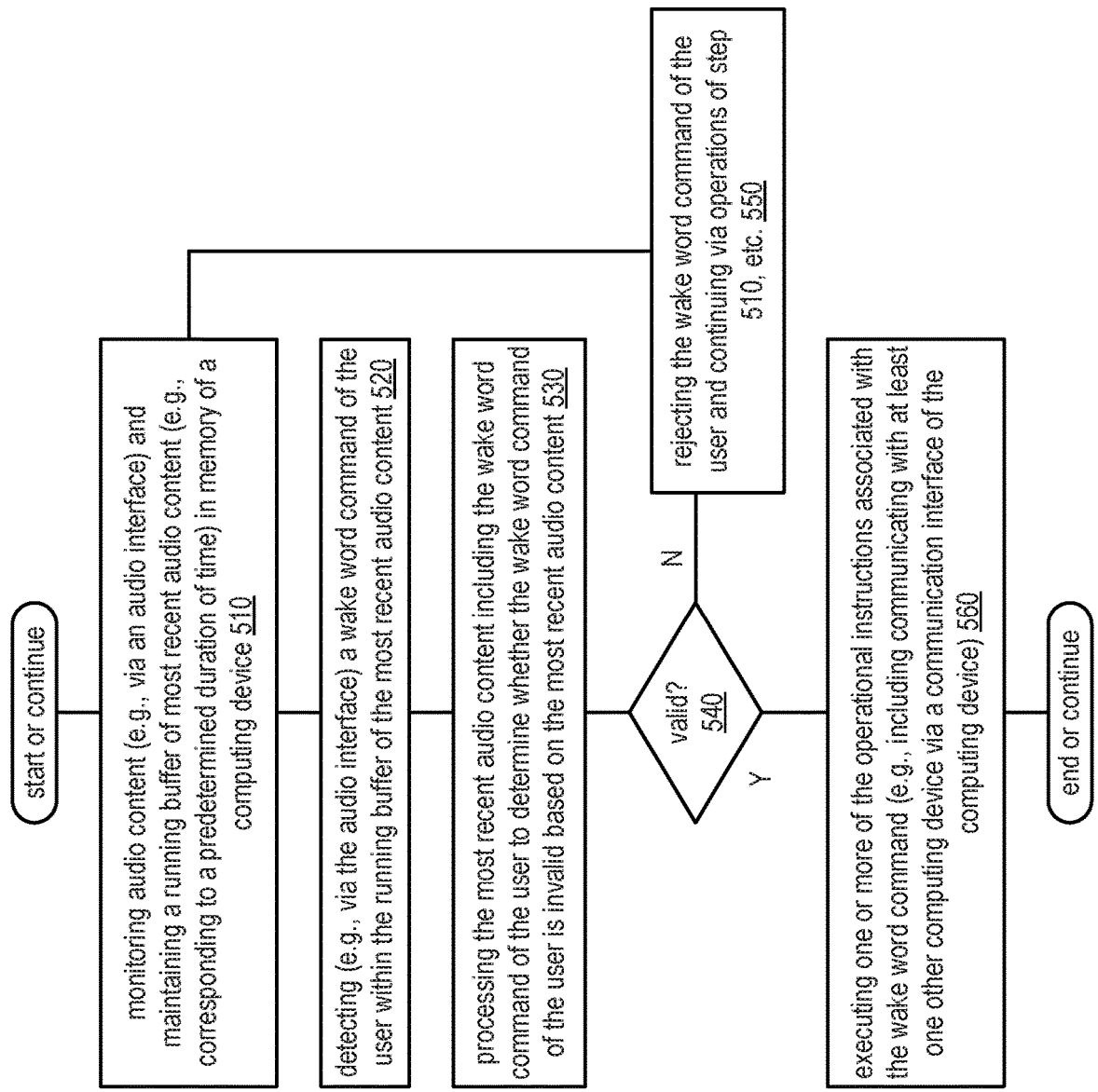
FIG. 5 is a diagram illustrating an embodiment of a method for execution by one or more computing devices according to various embodiments of the present invention.

FIG. 5 is a diagram illustrating an embodiment of a method 500 for execution by one or more computing devices according to various embodiments of the present invention.

The method 500 operates in step 510 by monitoring audio content (e.g., via an audio interface of the computing device that is configured to interface and communicate with a user) and maintaining a running buffer of most recent audio content that corresponds to a predetermined duration of time in memory of the computing device. The method 500 then continues in step 520 by detecting (e.g., via the audio interface) a wake word command of the user within the running buffer of the most recent audio content.

Based on detection of the wake word command of the user within the running buffer of the most recent audio content, the method 500 operates in step 530 by processing the most recent audio content including the wake word command of the user to determine whether the wake word command of the user is valid or invalid based on the most recent audio content (step 540).

Based on determination that the wake word command is invalid based on the most recent audio content in step 540, the method 500 operates in step 550 by rejecting the wake word command of the user and continuing via the operations of step 510 (e.g., continuing to monitor the audio content, via the audio interface, and maintaining the running buffer of the most recent audio content that corresponds to the predetermined duration of time in the memory).

Alternatively, based on determination that the wake word command is valid based on the most recent audio content in step 540, the method 500 operates in step 560 by executing one or more of the operational instructions associated with the wake word command. Some examples of the one or more of the operational instructions associated with the wake word command include communicating with at least one other computing device via a communication interface of the computing device (e.g., providing instructions, requests, etc. to the at least one other computing device and/or receiving information, content, media, etc. from the at least one other computing device).

Other examples and/or variants of the method 500 also operate by making the determination that the wake word command is invalid based on the most recent audio content including based on determining that the wake word command of the user is included in at least two separate sentences of the user.

Even other examples and/or variants of the method 500 also operate by making the determination that the wake word command is invalid based on determining that the wake word command of the user comparing unfavorably with a wake word command context or being non-compliant with the wake word command context.

In addition, certain variants of the method 500 also operate by determining the wake word command context including to process at least one of a first portion of the most recent audio content preceding the wake word command of the user or a second portion of the most recent audio content following the wake word command of the user.

Some other alternative variants of the method 500 operate by identifying the user based on the wake word command of the user, a first portion of the most recent audio content preceding the wake word command of the user, and/or a second portion of the most recent audio content following the wake word command of the use. Based on identity of the user, such other alternative variants of the method 500 operate by identifying a threshold period of time that is associated with the user. Such other alternative variants of the method 500 also operate by making the determination that the wake word command is invalid based on a period of silence following the wake word command comparing unfavorably with the threshold period of time that is associated with the user.

Figure 6:
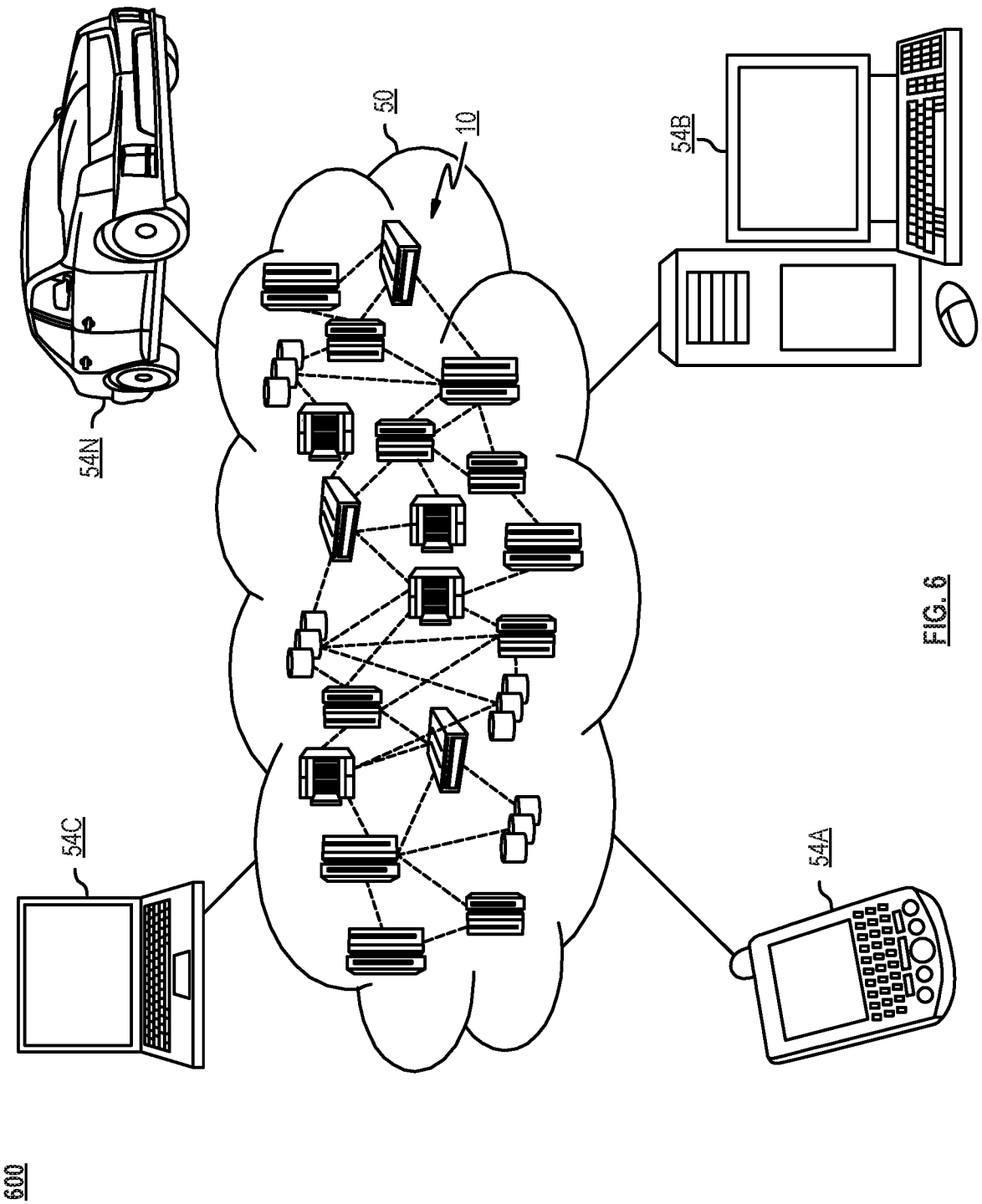
FIG. 6 depicts a cloud computing environment according to various embodiments of the present invention.

FIG. 6 depicts a cloud computing environment 600 according to various embodiments of the present invention. FIG. 6 presents an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
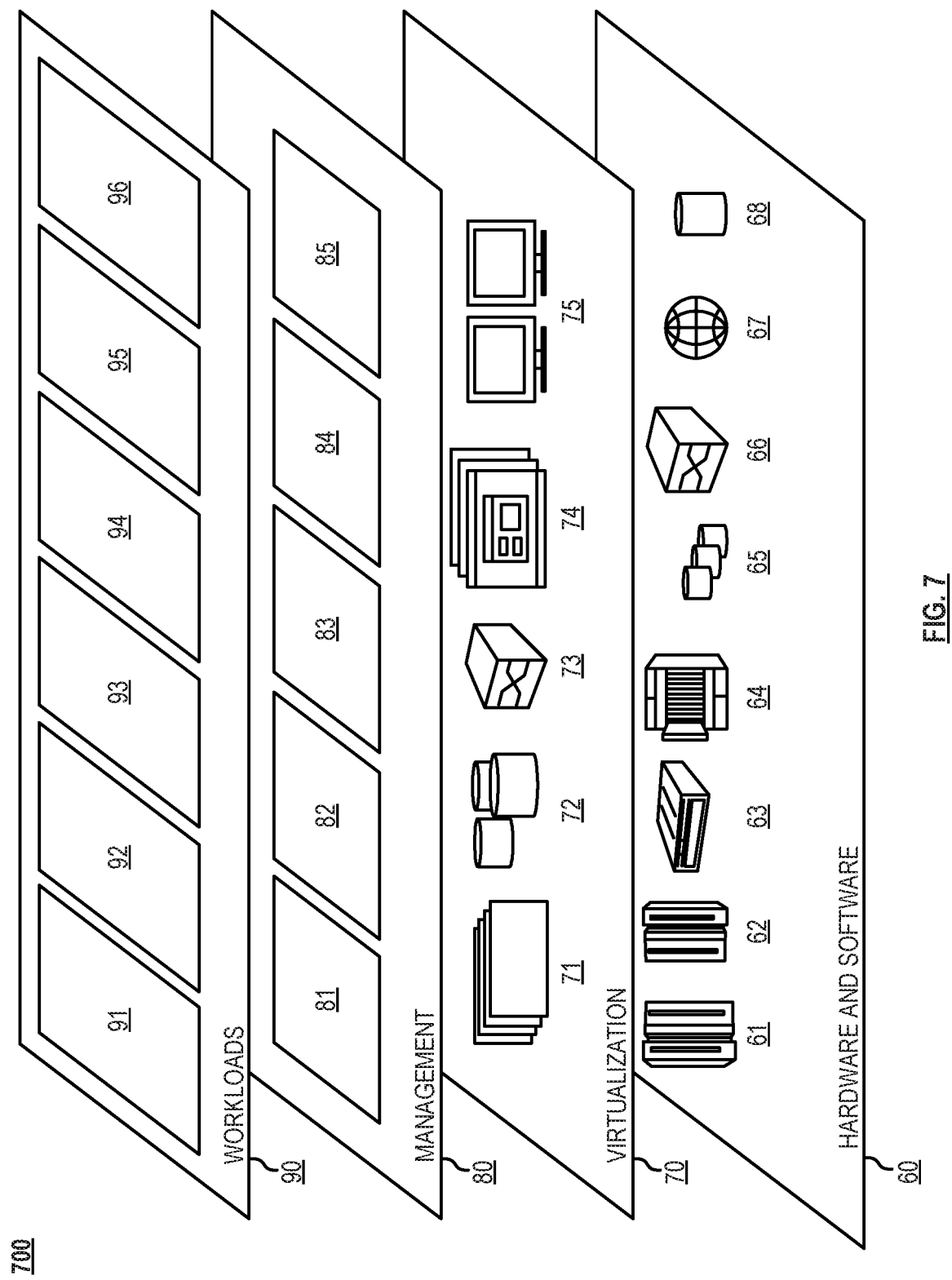
FIG. 7 depicts abstraction model layers according to various embodiments of the present invention.

FIG. 7 depicts abstraction model layers 700 according to various embodiments of the present invention. Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, one or more hardware components can be implemented by utilizing the computing device 801 of FIG. 8.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and wake command nullification based on invalidity of a wake command word, processing, and operations 96.

FIG. 8 depicts a block diagram 800 of a computing device according to various embodiments of the present invention. FIG. 8 depicts a block diagram of components of a computing device 801, which can be utilized to implement some or all of the cloud computing nodes 10, some or all of the computing devices 54A-N of FIG. 6, and/or to implement other computing devices described herein in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Computing device 801 can include one or more processors 802, one or more computer-readable RAMs 804, one or more computer-readable ROMs 806, one or more computer readable storage media 808, device drivers 812, read/write drive or interface 814, and network adapter or interface 816, all interconnected over a communications fabric 818. Communications fabric 818 can be implemented with any architecture designed for passing data and/or control information between processors (such as microprocessors, communications and network processors, etc.), system memory, peripheral devices, and any other hardware components within the system.

One or more operating systems 810 and/or application programs 811, such as network application server software 67 and database software 68 of FIG. 7, are stored on one or more of the computer readable storage media 808 for execution by one or more of the processors 802 via one or more of the respective RAMs 804 (which typically include cache memory). In the illustrated embodiment, each of the computer readable storage media 808 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 801 can also include a R/W drive or interface 814 to read from and write to one or more portable computer readable storage media 826. Application programs 811 on computing devices 801 can be stored on one or more of the portable computer readable storage media 826, read via the respective R/W drive or interface 814 and loaded into the respective computer readable storage media 808.

Computing device 801 can also include a network adapter or interface 816, such as a TCP/IP adapter card or wireless communication adapter. Application programs 811 on computing devices 54A-N can be downloaded to the computing device from an external computer or external storage device via a network (for example, the Internet, a local area network or other wide area networks or wireless networks) and network adapter or interface 816. From the network adapter or interface 816, the programs may be loaded into the computer readable storage media 808. The network may comprise copper wires, optical fibers, wireless transmission, routers, firewalls, switches, gateway computers and edge servers.

Computing device 801 can also include a display screen 820, a keyboard or keypad 822, and a computer mouse or touchpad 824. Device drivers 812 interface to display screen 820 for imaging, to keyboard or keypad 822, to computer mouse or touchpad 824, and/or to display screen 820 for pressure sensing of alphanumeric character entry and user selections. The device drivers 812, R/W drive or interface 814, and network adapter or interface 816 can comprise hardware and software stored in computer readable storage media 808 and/or ROM 806.

This disclosure presents, among other things, solutions to determine if a spoken wake word command is valid or invalid including based on one or more of the following approaches: (1) analysis if a wake phrase was part of two different sentences, (2) analysis of the previous few minutes of conversation using Watson Alchemy and contrast it to the current wake word command for context, (3) analysis of a wake phrase & command's validity by determining the length of silence following the command, and (4) analysis of post wake phrase conversation with pre-wake phrase conversation to determine contextual flow.

The disclosure presents, among other things, various advantages in determining if a spoken wake word command is valid or invalid including: (1) a system that will prevent request associated with a wake word command from being performed from different always on listening devices, (2) a system to distinguish between proper wake command usage and normal user language processing within human conversations, and (3) awareness of people in the room regarding Internet of Things (TOT) devices and usage of any "wake" commands.

For some examples, various aspects, embodiments, and/or examples of the invention can provide for proper differentiation between casually telling your friend on the phone you don't need a ride since "you'll be having Alexa call you an Uber driver for a lift" as opposed to commanding a computing device implemented to support digital assistance and voice recognition: "Alexa, call me an Uber driver now."

Various aspects, embodiments, and/or examples of the invention can provide for proper differentiation between casually telling a family member that we can now have google home change the settings to the thermostat to 72 degrees as opposed to commanding a computing device implemented to support digital assistance and voice recognition: "Google Home: Turn my thermostat to 72 degrees."

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
   a communication interface configured to interface and communicate with a communication system;
   an audio interface configured to interface and communicate with a user; memory that stores operational instructions; and
   processing circuitry operably coupled to the communication interface, the audio interface, and to the memory, wherein the processing circuitry is configured to execute the operational instructions to:
      monitor audio content, via the audio interface, and maintain a running buffer of most recent audio content that corresponds to a predetermined duration of time in the memory;
      detect, via the audio interface, a wake word command within the running buffer of the most recent audio content;
      process the most recent audio content including the wake word command to determine a number of sentences recorded on the most recent audio content;
      responsive to a determination that two or more sentences are recorded on the most recent audio content, identify a first word of the wake word command in a first sentence and a second word of the wake word command in a second sentence;
      responsive to identifying words of the wake word command in the two or more sentences, reject the wake word command and continue to monitor the audio content, via the audio interface, and maintain the running buffer of the most recent audio content that corresponds to the predetermined duration of time in the memory;
   wherein the wake word command is made up of at least two words.

2. The computing device of claim 1, wherein the processing circuitry is further configured to execute the operational instructions to:
   responsive to a determination that only one sentence is recorded on the most recent audio content, execute one or more of the operational instructions associated with the wake word command including communicating with at least one other computing device via the communication interface.

3. The computing device of claim 1, wherein the processing circuitry is further configured to execute the operational instructions to:
   make the determination that the wake word command is invalid based on determining that the wake word command comparing unfavorably with a wake word command context or being non-compliant with the wake word command context.

4. The computing device of claim 3, wherein the processing circuitry is further configured to execute the operational instructions to:
   determine the wake word command context including to process at least one of a first portion of the most recent audio content preceding the wake word command or a second portion of the most recent audio content following the wake word command.

5. The computing device of claim 1, wherein the processing circuitry is further configured to execute the operational instructions to:
   make the determination that the wake word command is invalid based on a period of silence following the wake word command comparing unfavorably with a threshold period of time.

6. The computing device of claim 1, wherein the processing circuitry is further configured to execute the operational instructions to:
    identify the user based on at least one of the wake word command of the user, a first portion of the most recent audio content preceding the wake word command of the user, or a second portion of the most recent audio content following the wake word command of the use;
    based on identity of the user, identify a threshold period of time that is associated with the user; and make the determination that the wake word command is invalid based on a period of silence following the wake word command comparing unfavorably with the threshold period of time that is associated with the user.

7. The computing device of claim 1, wherein the communication system includes at least one of a wireless communication system, a wire lined communication system, a non-public intranet system, a public internet system, a local area network (LAN), a wireless local area network (WLAN), a wide area network (WAN), a satellite communication system, a fiber-optic communication system, or a mobile communication system.

8. A computing device comprising:
    a communication interface configured to interface and communicate with a communication system;
    an audio interface configured to interface and communicate with a user;
    memory that stores operational instructions; and
    processing circuitry operably coupled to the communication interface, the audio interface, and to the memory, wherein the processing circuitry is configured to execute the operational instructions to:
    monitor audio content, via the audio interface, and maintain a running buffer of most recent audio content that corresponds to a predetermined duration of time in the memory;
    detect, via the audio interface, a wake word command within the running buffer of the most recent audio content;
    process the most recent audio content including the wake word command to determine a number of sentences recorded on the most recent audio content;
    responsive to a determination that two or more sentences are recorded on the most recent audio content, identifying a first portion of the wake word command in a first sentence and a second portion of the wake word command in a second sentence;
    reject the wake word command and continue to monitor the audio content, via the audio interface, and maintain the running buffer of the most recent audio content that corresponds to the predetermined duration of time in the memory.

9. The computing device of claim 8, wherein the processing circuitry is further configured to execute the operational instructions to:
    determine the wake word command context including to process at least one of a first portion of the most recent audio content preceding the wake word command or a second portion of the most recent audio content following the wake word command.

10. The computing device of claim 8, wherein the processing circuitry is further configured to execute the operational instructions to:
    identify the user based on at least one of the wake word command, a first portion of the most recent audio content preceding the wake word command, or a second portion of the most recent audio content following the wake word command of the use;
    based on identity, identify a threshold period of time that is associated with the user; and
    make the determination that the wake word command is invalid based on a period of silence following the wake word command comparing unfavorably with the threshold period of time that is associated with the user.

11. The computing device of claim 8, wherein the communication system includes at least one of a wireless communication system, a wire lined communication system, a non-public intranet system, a public internet system, a local area network (LAN), a wireless local area network (WLAN), a wide area network (WAN), a satellite communication system, a fiber-optic communication system, or a mobile communication system.

12. A method for execution by a computing device, the method comprising:
    monitoring audio content, via an audio interface of the computing device that is configured to interface and communicate with a user, and maintaining a running buffer of most recent audio content that corresponds to a predetermined duration of time in memory of the computing device;
    detecting, via the audio interface, a wake word command within the running buffer of the most recent audio content; and
    based on detection of the wake word command within the running buffer of the most recent audio content:
    processing the most recent audio content including the wake word command to determine whether the wake word command is invalid based on the most recent audio content; and
    based on determination that the wake word command is invalid based on the most recent audio content, rejecting the wake word command and continuing to monitor the audio content, via the audio interface, and maintaining the running buffer of the most recent audio content that corresponds to the predetermined duration of time in the memory.

13. The method of claim 12 further comprising:
    responsive to a determination that only one sentence is recorded on the most recent audio content, execute one or more of the operational instructions associated with the wake word command including communicating with at least one other computing device via the communication interface.

14. The method of claim 12 further comprising:
    making the determination that the wake word command is invalid based on determining that the wake word command comparing unfavorably with a wake word command context or being non-compliant with the wake word command context.

15. The method of claim 14 further comprising:
    determining the wake word command context including to process at least one of a first portion of the most recent audio content preceding the wake word command or a second portion of the most recent audio content following the wake word command.

16. The method of claim 12 further comprising:
    identifying the user based on at least one of the wake word command, a first portion of the most recent audio content preceding the wake word command, or a second portion of the most recent audio content following the wake word command of the use;
    based on identity, identifying a threshold period of time that is associated with the user; and making the determination that the wake word command is invalid based on a period of silence following the wake word command comparing unfavorably with the threshold period of time that is associated with the user.

17. The method of claim 12, wherein the computing device is in communication with a communication system that includes at least one of a wireless communication system, a wire lined communication system, a non-public intranet system, a public internet system, a local area network (LAN), a wireless local area network (WLAN), a wide area network (WAN), a satellite communication system, a fiber-optic communication system, or a mobile communication system.

\* \* \* \* \*